(12) United States Patent
Xu et al.

(10) Patent No.: US 12,507,172 B2
(45) Date of Patent: Dec. 23, 2025

(54) ENERGY SAVING METHOD AND APPARATUS, PARAMETER CONFIGURATION METHOD AND APPARATUS, TERMINAL, BASE STATION AND STORAGE MEDIUM

(71) Applicant: ZTE CORPORATION, Shenzhen (CN)

(72) Inventors: Hui Xu, Shenzhen (CN); Jinli Meng, Shenzhen (CN); Xiang Wang, Shenzhen (CN); Yihua Huang, Shenzhen (CN); Chen Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 404 days.

(21) Appl. No.: 18/005,505

(22) PCT Filed: Jun. 16, 2021

(86) PCT No.: PCT/CN2021/100346
§ 371 (c)(1),
(2) Date: Jan. 13, 2023

(87) PCT Pub. No.: WO2022/012254
PCT Pub. Date: Jan. 20, 2022

(65) Prior Publication Data
US 2023/0276359 A1    Aug. 31, 2023

(30) Foreign Application Priority Data

Jul. 14, 2020  (CN) .......... 202010675923.2

(51) Int. Cl.
*H04W 52/02* (2009.01)
*H04W 72/11* (2023.01)
(Continued)

(52) U.S. Cl.
CPC ........ *H04W 52/0232* (2013.01); *H04W 72/11* (2023.01); *H04W 72/25* (2023.01); *H04W 76/20* (2018.02); *H04W 92/18* (2013.01)

(58) Field of Classification Search
CPC ......... H04W 52/0232; H04W 52/0241; H04W 52/0216; H04W 52/0248; H04W 72/11;
(Continued)

(56) References Cited

U.S. PATENT DOCUMENTS 11,825,412 B2 * 11/2023 Sridharan ......... H04W 52/0229
2016/0330676 A1 * 11/2016 Thangarasa ........... H04W 48/20
(Continued)

FOREIGN PATENT DOCUMENTS

CN 102404795 A 4/2012
CN 104854888 A 8/2015
(Continued)

OTHER PUBLICATIONS

International Search Report in Application No. PCT/CN2021/100346, dated Sep. 8, 2021, 4 pages including translation.
(Continued)

*Primary Examiner* — Robert C Scheibel
(74) *Attorney, Agent, or Firm* — Morgan, Lewis & Bockius LLP

(57) ABSTRACT

An energy saving method and an energy saving apparatus, a parameter configuration method and a parameter configuration apparatus, a UE, a base station and a storage medium are provided. The energy saving method includes: acquiring a sidelink discontinuous reception (DRX) parameter, where the sidelink DRX parameter is determined according to location information, a sidelink communication type and a related configuration parameter of a UE; and within a sidelink sleep time corresponding to the sidelink DRX parameter, not receiving sidelink control information (SCI) from a target equipment.

17 Claims, 4 Drawing Sheets

(51) Int. Cl.
  *H04W 72/25* (2023.01)
  *H04W 76/20* (2018.01)
  *H04W 92/18* (2009.01)

(58) Field of Classification Search
  CPC ..... H04W 72/25; H04W 76/20; H04W 76/27; H04W 76/40; H04W 76/28; H04W 92/18; Y02D 30/70
  See application file for complete search history.

(56) References Cited

U.S. PATENT DOCUMENTS

| | | | |
|---|---|---|---|
| 2019/0037534 A1 | 1/2019 | Yasukawa et al. | |
| 2019/0075447 A1 | 3/2019 | Lee et al. | |
| 2020/0146094 A1 | 5/2020 | Wu et al. | |
| 2021/0059005 A1* | 2/2021 | Hosseini | H04W 76/28 |
| 2021/0219248 A1* | 7/2021 | Wu | H04W 56/001 |
| 2021/0227620 A1* | 7/2021 | Pan | H04W 4/40 |
| 2021/0227621 A1* | 7/2021 | Pan | H04W 72/0446 |
| 2021/0243836 A1* | 8/2021 | Wu | H04W 72/20 |
| 2022/0232660 A1* | 7/2022 | Back | H04W 76/28 |
| 2022/0353815 A1* | 11/2022 | Lin | H04W 52/0232 |
| 2023/0107246 A1* | 4/2023 | Kang | H04W 52/02 370/329 |
| 2023/0138737 A1* | 5/2023 | Hong | H04W 76/28 370/329 |
| 2023/0156858 A1* | 5/2023 | Freda | H04W 52/0216 370/329 |
| 2023/0328840 A1* | 10/2023 | Cheng | H04W 8/005 370/329 |

FOREIGN PATENT DOCUMENTS

| | | |
|---|---|---|
| CN | 108307486 A | 7/2018 |
| CN | 108307489 A | 7/2018 |
| CN | 108307547 A | 7/2018 |
| CN | 109246801 A | 1/2019 |
| CN | 109429306 A | 3/2019 |
| CN | 109792688 A | 5/2019 |
| CN | 110392431 A | 10/2019 |
| CN | 110663272 A | 1/2020 |
| CN | 110679190 A | 1/2020 |
| CN | 110838899 A | 2/2020 |
| CN | 111213393 A | 5/2020 |
| CN | 111278171 A | 6/2020 |
| CN | 111405610 A | 7/2020 |
| CN | 112512102 A | 3/2021 |
| WO | WO2017134986 A1 | 8/2017 |
| WO | WO2017/196611 A1 | 11/2017 |
| WO | WO 2018/064477 A1 | 4/2018 |
| WO | WO2020068252 A1 | 4/2020 |

OTHER PUBLICATIONS

LG Electronics Inc., "[Running CR] Introduction of 5G V2X with NR Sidelink", 3GPP TSG-RAN WG2 Meeting #108, R2-1916638, Reno, USA Nov. 18-22, 2019.
LG Electronics Inc., "New KI: DRX for pedestrian UEs", SA WG2 Meeting #139E (e-meeting), S2-2004752, Jun. 1-12, 2020, Elbonia.
Chinese Office Action for Application No. 202010675923.2, dated Apr. 19, 2024, 10 pages including translation.
Chinese Search Report for Application No. 202010675923.2, dated Apr. 19, 2024, 10 pages including translation.
Extended European Search Report in Application No. 21842132.9 dated Jul. 22, 2024, 13 pages.

* cited by examiner

ENERGY SAVING METHOD AND APPARATUS, PARAMETER CONFIGURATION METHOD AND APPARATUS, TERMINAL, BASE STATION AND STORAGE MEDIUM

TECHNICAL FIELD

This application relates to the field of wireless communication networks, for example, to an energy saving method and an energy saving apparatus, a parameter configuration method and a parameter configuration apparatus, a terminal, a base station and a storage medium.

BACKGROUND

The new radio (NR) technology based on long term evolution (LTE) is applied to vehicle-to-network (V2N) communication to realize interconnection and communication of vehicle-to-vehicle (V2V), vehicle to infrastructure (V2I), vehicle to pedestrian (V2P). A road side unit (RSU) can receive vehicle requests and ensure that a vehicle can be accessed to the networks; and the RSU has a function of a gateway, and further has functions of data calculation, data storage and data forwarding.

A user equipment (UE) can be understood as a pedestrian user equipment, and is also referred to as a P-UE, which generally has a low battery capacity and limited wireless capabilities. The UE supports the operation of various vehicle to everything (V2X) applications, the qualities of services (QoS) of different V2X applications are different. In the scenario of sidelink communication, the pedestrian user equipment sends and receives V2X messages continuously, resulting in relatively high energy consumption.

SUMMARY

An energy saving method and an energy saving apparatus, a parameter configuration method and a parameter configuration apparatus, a terminal, a base station, and a storage medium are provided according to the present disclosure, so as to reduce the energy consumption of the terminal.

An energy saving method is provided according to an embodiment of the present disclosure, which is applied to a terminal. The energy saving method includes:

acquiring a sidelink discontinuous reception (DRX) parameter, specifically, the sidelink DRX parameter is determined according to location information, a sidelink communication type and a related configuration parameter of the terminal; and within a sidelink sleep time corresponding to the sidelink DRX parameter, not receiving sidelink control information (SCI) from a target equipment.

A parameter configuration method is further provided according to an embodiment of the present disclosure, which is applied to a base station. The parameter configuration method includes:

configuring a related configuration parameter, specifically, the related configuration parameter is used to instruct a terminal to acquire a sidelink DRX parameter; and sending the related configuration parameter to a terminal whose location information is in-coverage.

An energy-saving apparatus is further provided according to an embodiment of the present disclosure, which includes: a parameter acquisition module; and a sleep module.

The parameter acquisition module is configured to acquire a sidelink DRX parameter, specifically, the sidelink DRX parameter is determined according to location information, a sidelink communication type and a related configuration parameter of a terminal; and the sleep module is configured to not receive sidelink control information SCI from a target equipment within a sidelink sleep time corresponding to the sidelink DRX parameter.

A parameter configuration apparatus is further provided according to an embodiment of the present disclosure, which includes: a parameter configuration module and a sending module.

The parameter configuration module is configured to configure a related configuration parameter, and the related configuration parameter is used to instruct a terminal to acquire a sidelink DRX parameter; and the sending module is configured to send the related configuration parameter to a terminal whose location information is in-coverage.

A terminal is further provided according to an embodiment of the present disclosure, which includes:

one or more processors; and a storage apparatus for storing one or more programs. The one or more programs, when executed by the one or more processors, cause the one or more processors to implement the above energy saving method.

A base station is further provided according to an embodiment of the present disclosure, which includes:

one or more processors; and a storage apparatus for storing one or more programs. The one or more programs, when executed by the one or more processors, cause the one or more processors to implement the above parameter configuration method.

A computer-readable storage medium is further provided according to an embodiment of the present disclosure, a computer program is stored on the computer-readable storage medium, and the program, when executed by a processor, implements the above energy saving method or the above parameter configuration method.

DETAILED DESCRIPTION

The present disclosure is described hereinafter with reference to the drawings and embodiments.

Vehicle-to-X V2X communication can realize the interconnection and communication of vehicle-to-vehicle (V2V), vehicle-to-infrastructure (V2I), and vehicle-to-pedestrian (V2P). Specifically, the UE refers to a pedestrian UE P-UE in the vehicle-to-pedestrian (V2P) communication. The P-UE is generally a handheld mobile device with a low battery capacity and limited wireless capabilities. In the scenario of sidelink communication, the P-UE continuously sends and receives V2X messages, which makes the energy consumption of the P-UE high.

V2X may be implemented through PC5 interface or Uu interface, specifically, the PC5 interface refers to an air interface of device-to-device (D2D), and the Uu interface refers to an air interface of a UE to a base station (for example, the next generation NodeB (gNB)). In the embodiments of this application, PC5 and Sidelink represent the same meaning, and both are used to represent an air interface link between a P-UE and the other UE.

In the embodiments of the present disclosure, an energy saving method is provided. The method is applied to a UE, namely a P-UE.

Figure 1:
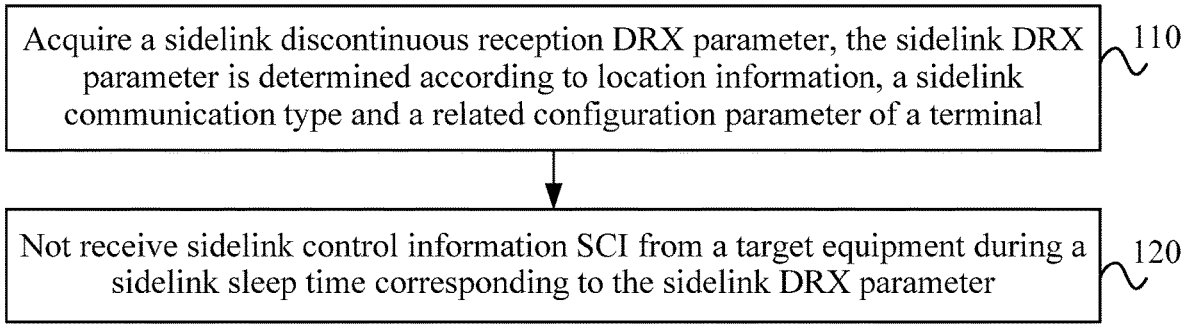
FIG. 1 is a flowchart of an energy saving method according to an embodiment.

FIG. 1 is a flowchart of an energy saving method according to an embodiment. As shown in FIG. 1, the method according to this embodiment includes an operation 110 and an operation 120.

The operation 110 may include acquiring a sidelink DRX parameter, specifically, the sidelink DRX parameter is determined according to location information, a sidelink communication type and a related configuration parameter of a UE.

In this embodiment, the sidelink DRX parameter, namely a PC5 DRX parameter, mainly includes a periodicity of PC5 DRX, which is used to reflect when the P-UE can stop monitoring a physical sidelink control channel. The sidelink DRX parameter is related to location information, a sidelink communication type, and a related configuration parameter of the UE, specifically, the related configuration parameter includes a parameter configured by a network side and a preconfigured parameter.

In an embodiment, a P-UE can independently select a sidelink DRX parameter according to location information, a sidelink communication type and a related configuration parameter, or a network side can determine a sidelink DRX parameter according to location information, a sidelink communication type and a related configuration parameter and indicate the sidelink DRX parameter to the P-UE.

The operation 120 may include not receiving the sidelink control information (SCI) from a target equipment during a sidelink sleep time corresponding to the sidelink DRX parameter.

In this embodiment, the P-UE or the network side notifies the target equipment of the sidelink DRX parameter, and the target equipment will not send data to the P-UE during the sleep duration corresponding to the sidelink DRX parameter of the P-UE. Therefore, the P-UE can stop monitoring the physical sidelink control channel during the sleep duration according to the sidelink DRX parameter, thereby reducing energy consumption of the UE.

In this embodiment, the P-UE acquires a sidelink DRX parameter and notifies the target equipment of the sidelink DRX parameter, and on the basis of the sidelink DRX parameter, the P-UE can stop monitoring the physical sidelink control channel within a period of time corresponding to the sidelink DRX parameter, thereby reducing energy consumption of the UE, and saving power of the UE.

In an embodiment, the location information includes one of the following: in-coverage or out-of-coverage; and the sidelink communication type includes one of the following: sidelink unicast communication, sidelink groupcast communication, or sidelink broadcast communication.

In this embodiment, NR V2X communication supports unicast, groupcast, and broadcast, and transmissions of the three sidelink communication types may all be implemented in-coverage of the base station, out-of-coverage of the base station, or partially in-coverage of the base station. NR V2X communication includes mode1 and mode2, specifically, the mode1 refers to that a base station (gNB) configures the PC5 resource for transmitting the V2X service, and the mode2 refers to that a UE independently selects the PC5 resource for transmitting the V2X service.

In an embodiment, the sidelink DRX parameter is also determined according to a connection state of the UE; the connection state includes one of the following: a radio resource control (RRC) connected state, an RRC idle state, or an RRC inactive state.

Three RRC states of UE are defined in NR: an RRC idle state, an RRC inactive state and an RRC connected state. Specifically, in the RRC idle state, the UE context is retained in the UE, gNB, and 5GC, and non-access stratum (NAS) connection and NG interface connection are retained. The UE in the RRC inactive state is based on an RRC connection recovery process, and is required to enter the connected state when sending data. The UE is required to be in the RRC idle state, the RRC inactive state or the RRC connected state to receive data.

There are two types of discontinuous reception (DRX). One type is IDLE discontinuous reception, that is, discontinuous reception when a UE is in the RRC idle state or RRC inactive state, because when the UE is in the RRC idle state or RRC inactive state, no RRC connection has been setup and no dedicated resource is available to the user. Therefore, it is necessary to monitor a paging channel and broadcast channel. When the DRX cycle is defined, discontinuous reception can be implemented. The other type is ACTIVE discontinuous reception, that is, discontinuous reception when the UE is in the RRC connected state. In this case, the configuration of system resources can be optimized, and more importantly, the power of the UE can be saved, without requiring the UE to enter the RRC idle state or the RRC inactive state mode, for example, for some non-real-time applications, such as web browsing, instant messaging, etc., there is always a period of time in which it is not necessary for the UE to always monitor downlink data and related processing, thus in this case, the mode of discontinuous reception can be used, and if RRC connection is still retained when the UE is in the state of discontinuous reception, the speed for the UE to be switched to the active state is very high.

A short DRX cycle and a long DRX cycle are presented in a discontinuous reception mode in the RRC connected state. Generally, a UE enters a DRX short cycle first, and when the DRX short cycle timer expires, the UE enters a DRX long cycle. When the DRX cycle is longer, the time for which the UE is in sleep is longer, and the energy saved is more, but the cost is that if a data packet arrives during the sleep period, it is apt to causing packet sending and receiving delay, which adversely affects the user experience. On duration, the UE monitors and decodes the physical downlink control channel (PDCCH), and if the UE finds an up link (UL) grant scheduling or down link (DL) grant scheduling for itself, the UE reads the content of the physical downlink shared channel (PDSCH) or sends data, otherwise, the UE enters the sleep state to achieve energy saving. In DRX in the RRC idle state, the UE monitors paging messages in each DRX cycle, and if it finds a paging message for itself, it receives downlink data, otherwise, the UE enters the sleep state again. In addition, before the UE in the RRC idle state is waken up from the sleep state to monitor paging messages, the UE in the RRC idle state is generally required to perform cell reselection through measurement.

In an embodiment, the sidelink DRX parameter is notified to the target equipment by the UE or by a network side.

In this embodiment, the P-UE or the network side notifies the target equipment of the sidelink DRX parameter, the target equipment is an equipment such as a peer UE participating in the sidelink unicast communication, or a member UE in a sidelink groupcast group, or other UEs within a broadcasting scope etc., to enable the target equipment to avoid sending data to the P-UE during a sleep duration corresponding to the sidelink DRX parameter of the P-UE, and the P-UE stops monitoring the physical sidelink control channel during the sleep duration, thus reducing energy consumption of the UE.

In an embodiment, a sidelink DRX parameter is determined by a network side or independently selected by a UE; in a case where location information of the UE is in-coverage, the sidelink DRX parameter is determined by the network side or independently selected by the UE; and in a case where location information of the UE is out-of-coverage, the sidelink DRX parameter is independently selected by the UE.

In this embodiment, if the UE is in-coverage of a base station, the UE may independently select a sidelink DRX parameter, or the network side may determine a sidelink DRX parameter and indicate the sidelink DRX parameter to the UE, and the UE can determine to adopt which method to acquire the sidelink DRX parameter according to the indication from the network side; and if the UE is out the coverage of the base station, the UE independently selects the sidelink DRX parameter.

In an embodiment, the network side includes at least one of the following: a base station, or an AMF; specifically, the base station indicates the sidelink DRX parameter to the UE through an RRC signaling; and the AMF indicates the sidelink DRX parameter to the UE through an NAS signaling.

Figure 2:
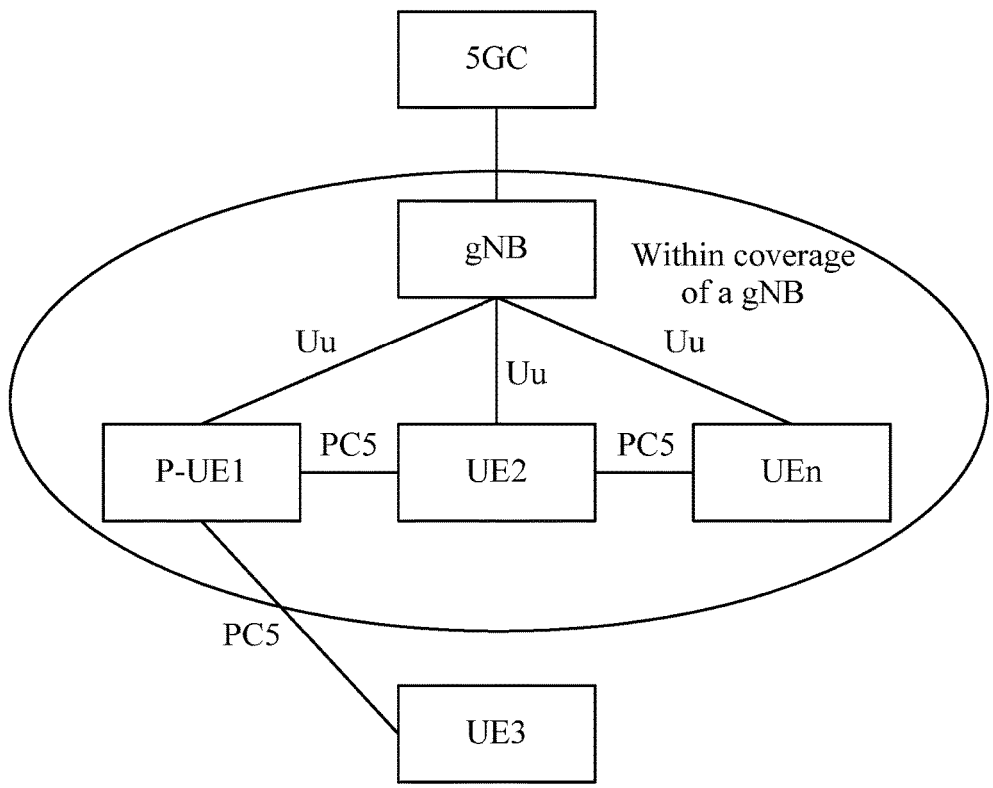
FIG. 2 is a schematic diagram of a sidelink communication according to an embodiment.

FIG. 2 is a schematic diagram of a sidelink communication according to an embodiment. As shown in FIG. 2, a V2X network architecture includes next generation radio access network (NG-RAN) base stations, such as gNBs; and further includes the 5th generation core (5GC), and the 5GC at least includes access and mobility management functions (AMF); and further includes multiple UEs supporting V2X, one of the UEs is a P-UE, PC5 air interfaces are used for sidelink communication between UEs, and Uu air interfaces are used for communication between the gNB and the UEs.

In an embodiment, the energy saving method further includes: an operation 130 and an operation 140.

The operation 130 may include determining a sidelink on duration in the sidelink DRX cycle of the UE according to the sidelink DRX parameter.

The operation 140 may include starting a timer T and detecting SCI from the target equipment when the sidelink on duration starts; if the SCI from the target equipment is received before the timer T expires, restarting the timer T and continuing to detect SCI; if the SCI from the target equipment is not received before the timer T expires, entering sidelink sleep.

In this embodiment, the P-UE receives stage-1 SCI on a physical sidelink control channel (PSCCH) and stage-2 SCI on a physical sidelink share channel (PSSCH) and corresponding PSSCH and physical sidelink feedback channel (PSFCH), etc., on the PC5 interface during the on duration corresponding to the sidelink DRX parameter.

In an embodiment, the energy saving method further includes: an operation 150 and an operation 160.

The operation 150 may include determining a sidelink sleep time of the UE according to the sidelink DRX parameter; within the sidelink sleep time, the UE is allowed to receive semi-persistent scheduling (SPS) physical sidelink shared channel PSSCH and physical sidelink feedback channel PSFCH; the UE enters sidelink sleep by one of the following methods: a preset timer T expires, or a media access control (MAC) control element (CE) command.

In this embodiment, the sidelink DRX parameter mainly includes a periodicity of PC5 DRX, and the P-UE can determine the sidelink sleep time according to the sidelink DRX parameter. During the sleep duration corresponding to the sidelink DRX parameter, on the PC5 interface, no SCI (including stage-1 SCI on PSCCH and stage-2 SCI on PSSCH) is received, but PSFCH or SPS PSSCH can be received, and the peer UE can send PSFCH information or SPS PSSCH data to the P-UE.

In this embodiment, the UE stops the timer T and enters sidelink sleep in a case where a preset timer T expires or the UE receives a MAC CE command. Specifically, for the P-UE in the RRC connected state, the P-UE can enter the sidelink sleep by the preset timer T expiring or by receiving a MAC CE command; and for the P-UE in the RRC idle state or the RRC inactive state, the P-UE can enter the sidelink sleep by the preset timer T expiring.

In an embodiment, the unicast sidelink communication or groupcast sidelink communication supports hybrid automatic repeat request (HARQ) to retransmit, and the length of time of the DRX retransmission timer can be set according to the delay requirement of the V2X service.

In an embodiment, the related configuration parameter includes at least one of a first parameter (denoted as a para1), a second parameter (denoted as a para2), a third parameter (denoted as a para3), a fourth parameter (denoted as a para4) or a fifth parameter (denoted as a para5).

1) The first parameter is determined according to a minimum service delay among service delays of sidelink services running on the UE, and the P-UE selects a minimum service delay from sidelink service delays of V2X applications running on itself as the para1, and para1=min (delay budget of APP-1, delay budget of APP-2, . . . , delay budget of APP-n).

2) The second parameter is configured by the network side, and the para2 may include a parameter (denoted as a para2.1) configured by an NG-RAN and a parameter (denoted as a para2.2) configured by an AMF. In some embodiments, the para2 may further include a parameter (denoted as a para2.3) for inter-frequency scheduling.

3) The third parameter is preconfigured.

4) The fourth parameter is indicated by a target equipment (i.e., a peer UE participating in the sidelink unicast communication) of the sidelink unicast communication.

5) The fifth parameter is indicated by a Uu interface DRX parameter configured by the network side, and the para5 may include a parameter (denoted as a para5.1) configured by an NG-RAN and a parameter (denoted as a para5.2) configured by an AMF.

In an embodiment, in a case where the location information is in-coverage, the sidelink communication type is a sidelink unicast communication, and the connection state is an RRC connected state, the related configuration parameter includes a para1, a para2, and a para4; specifically, the para2 includes a parameter para2.1 configured by the base station; the sidelink DRX parameter is a minimum value among the para1, the para2.1 and the para4; and the target equipment includes a peer UE of the sidelink unicast communication.

In this embodiment, for a P-UE in-coverage, in the RRC connected state, and in the sidelink unicast communication, the sidelink DRX parameter is the minimum value among the related configuration parameters, i.e., para-c-u=min (para1, para2.1, para4).

Furthermore, if the para-c-u is smaller than a para5 configured by the network side, the P-UE requests the base station to modify the para5 to allow the para5 to be smaller than the para-c-u. If the base station accepts the request from the P-UE, that is, agrees to modify the para5 to allow the para5 to be smaller than the para-c-u, then the para-c-u is used as the final sidelink DRX, and the P-UE or the network side notifies the peer UE participating in the sidelink unicast communication of a final sidelink DRX parameter value para-c-u, to enable the peer UE to avoid sending data to the P-UE during the sidelink sleep time of the P-UE, but the peer UE can send PSFCH information or SPS PSSCH data to the P-UE during the sidelink sleep time of the P-UE. If the base station rejects the request from the P-UE, the current sidelink DRX function (or para-c-u) is invalid, and the P-UE can request the base station again to modify the para5 after a period of time (for example, after a timer T expires); but if the number of requests exceeds a threshold value, the sidelink DRX function (or the para-c-u) is invalid in-coverage of the current base station.

In an embodiment, in a case where the location information is in-coverage, the sidelink communication type is a sidelink groupcast communication or sidelink broadcast communication, and the connection state is an RRC connected state, the related configuration parameter includes a para1 and a para2; specifically, the para2 includes a parameter para2.1 configured by a base station; the sidelink DRX parameter is a minimum value in the para1 and the para2; and the target equipment includes a member UE in a groupcast group or a UE within a broadcasting scope.

In this embodiment, for a P-UE in-coverage, in the RRC connected state, and in the sidelink groupcast communication or sidelink broadcast communication, the sidelink DRX parameter is the minimum value in the related configuration parameters, i.e., para-c-g/b=min (para1, para2.1).

Furthermore, if the para-c-g/b is smaller than a para5 configured by the network side, the P-UE may request the base station to modify the para5 to allow the para5 to be smaller than the para-c-g/b. If the base station accepts the request from the P-UE, that is, agrees to modify the para5 to allow the para5 to be smaller than the para-c-g/b, then the para-c-g/b is used as the final sidelink DRX, and the P-UE or the network side notifies the target equipment (for example, a member UE in a groupcast group or other UE within a broadcasting scope) of a finally determined sidelink DRX parameter, to enable the relevant UE participating in the groupcast or broadcast communication to avoid sending data to the P-UE during the sidelink sleep time of the P-UE, but can send PSFCH information or SPS PSSCH data to the P-UE during the sidelink sleep time of the P-UE. If the base station rejects the request from the P-UE, the current sidelink DRX function (or para-c-g/b) is invalid, and the P-UE can request the base station again to modify the para5 after a period of time (for example, after a timer T expires); and if the number of requests exceeds a threshold value, the sidelink DRX function (or para-c-g/b) is invalid in-coverage of the current base station.

In an embodiment, in a case where the location information is in-coverage, the sidelink communication type is a sidelink unicast communication, and the connection state is an RRC idle state or RRC inactive state, the related configuration parameter includes a para1, a para2, and a para4; and the sidelink DRX parameter is a minimum value among the para1, the para2 and the para4; the target equipment includes a UE participating in a sidelink unicast communication.

In this embodiment, for a P-UE in-coverage, in the RRC idle state or the RRC inactive state, and in the sidelink unicast communication, the sidelink DRX parameter is the minimum value among related configuration parameters, that is, para-i/a-u=min (para1, para2 and para4).

In addition, if the para-i/a-u is smaller than the para5 configured by the network side, the P-UE can first enter the RRC connected state, and then request the base station to modify the para5 to allow the para5 to be smaller than the para-i/a-u. If the base station accepts the request from the P-UE, that is, agrees to modify the para5 to allow the para5 to be smaller than the para-i/a-u, then the para-i-a/u is used as a final sidelink DRX, and the P-UE or the network side notifies the target equipment of the finally determined sidelink DRX parameter, that is, the peer UE participating in the sidelink unicast communication, to enable the peer UE to avoid sending data to the P-UE during the sidelink sleep time of the P-UE, but can send PSFCH information or SPS PSSCH data to the P-UE during the sidelink sleep time of the P-UE. If the base station rejects the request from the P-UE, the current sidelink DRX function (or para-i/a-u) is invalid, and the P-UE can request the base station again to modify the para5 after a period of time (for example, after a timer T expires); if the number of requests exceeds a threshold value, the sidelink DRX function (or para-i/a-u) is invalid within coverage of the current base station.

In an embodiment, in a case where the location information is in-coverage, the sidelink communication type is a sidelink groupcast communication or a sidelink broadcast communication, and the connection state is an RRC idle state or an RRC inactive state, the related configuration parameter includes a para1 and a para2; and the sidelink DRX parameter is a minimum value in the para1 and the para2; the target equipment includes a member UE in a groupcast group or a UE within a broadcasting scope.

In this embodiment, for a P-UE in-coverage, in the RRC idle state or the RRC inactive state, and in the sidelink groupcast communication or the sidelink broadcast communication, the sidelink DRX parameter is the minimum value in the related configuration parameters, that is, para-i/a-g/b=min (para1, para2).

Furthermore, if the para-i/a-g/b is smaller than a para5 configured on the network side, the P-UE can first enter the RRC connected state, and then request the base station to modify the para5 to allow the para5 to be smaller than the para-i/a-g/b. If the base station accepts the request from the P-UE, that is, agrees to modify the para5 to allow the para5 to be smaller than the para-i/a-g/b, then the para-i/a-g/b is used as a final sidelink DRX, and the P-UE or the network side notifies the target equipment of the finally determined sidelink DRX parameter, to enable the related UE participating in the sidelink groupcast communication or sidelink broadcast communication to avoid sending data to the P-UE during the sidelink sleep time of the P-UE, but can send PSFCH information or SPS PSSCH data to the P-UE during the sidelink sleep time of the P-UE. If the base station rejects the request from the P-UE, the current sidelink DRX function (or the para-i/a-g/b) is invalid, and the P-UE can request the base station again to modify the para5 after a period of time (for example, after a timer T expires); if the number of requests exceeds a threshold value, the sidelink DRX function (or the para-i/a-g/b) is invalid within coverage of the current base station.

In an embodiment, the para2 includes: a parameter para2.1 configured by a base station and a parameter para2.2 configured by an AMF; or, the para2 includes: the parameter para2.1 configured by the base station, the parameter para2.2 configured by the AMF, and a parameter para2.3 for sidelink inter-frequency scheduling configured by the base station.

In this embodiment, for the case where the location information is in-coverage and the connection state is the RRC idle state or the RRC inactive state, the para2 includes the para2.1 and the para2.2. Alternatively, the para2 may include the para2.3 in addition to the para2.1 and the para2.2.

Correspondingly, for a P-UE whose sidelink communication type is a sidelink unicast communication, the sidelink DRX parameter is para-i/a-u=min (para1, para2.1, para2.2, para4), or para-i/a-u=min (para1, para2.1, para2.2, para2.3, para4).

For a P-UE whose sidelink communication type is sidelink groupcast communication or sidelink broadcast communication, the sidelink DRX parameter is para-i/a-g/b=min (para1, para2.1, para2.2), or para-i/a-g/b=min (para1, para2.1, para2.2, para2.3).

In an embodiment, in a case where the location information is out-of-coverage and the sidelink communication type is sidelink unicast communication, the related configuration parameter includes a first parameter, a third parameter and a fourth parameter; the sidelink DRX parameter is a minimum value among the related configuration parameters; and the target equipment includes a UE participating in a sidelink unicast communication.

In this embodiment, for a P-UE out-of-coverage and in the sidelink unicast communication, the sidelink DRX parameter is the minimum value among the related configuration parameters, i.e., para-o-u=min (para1, para3, para4), and para-o-u is used as a finally determined sidelink DRX parameter, and the P-UE can notify the para-o-u to the UE participating in the sidelink unicast communication.

In an embodiment, in a case where the location information is out-of-coverage and the sidelink communication type is sidelink a groupcast communication or a sidelink broadcast communication, the related configuration parameter includes a first parameter and a third parameter; the sidelink DRX parameter is a minimum value in the related configuration parameters; and the target equipment includes a member UE in a groupcast group or a UE within a broadcasting scope.

In this embodiment, for a P-UE out-of-coverage and in a sidelink groupcast communication or sidelink broadcast communication, the sidelink DRX parameter is the minimum value in the related configuration parameters, i.e., para-o-g/b=min (para1, para3), para-o-g/b is used as a finally determined sidelink DRX parameter, and the P-UE can notify the para-o-u to a groupcast member UE or a UE within a broadcasting scope.

In an embodiment, the related configuration parameter further includes a second parameter; and the second parameter includes a parameter for sidelink inter-frequency scheduling configured by the base station.

In this embodiment, for the case that the location information is out-of-coverage, the related configuration parameters may further include a para2, and the para2 includes a parameter para2.3 for sidelink inter-frequency scheduling configured by the base station.

Correspondingly, for a P-UE whose sidelink communication type is sidelink unicast communication, the sidelink DRX parameter is para-o-u=min (para1, para2.3, para3, para4). For a P-UE whose sidelink communication type is sidelink groupcast communication or sidelink broadcast communication, the sidelink DRX parameter is para-o-u=min (para1, para2.3, para3).

In an embodiment, the related configuration parameter further includes: a fifth parameter, and the fifth parameter includes a Uu interface DRX parameter configured by a network side; the method further includes: an operation 160.

The operation 160 may include, in a case where the sidelink DRX parameter is smaller than a fifth parameter, requesting the network side to modify the fifth parameter to allow the sidelink DRX parameter to be an integer multiple of the fifth parameter.

This embodiment is applicable to a P-UE in-coverage and in an RRC connected state, and the sidelink communication type of the P-UE may be a sidelink unicast communication, a sidelink groupcast communication or a sidelink broadcast communication. The P-UE may send a request to a base station to request the base station to modify a para5 (parameters of Uu DRX, including periodicities of Uu-DRX), to allow the parameters of sidelink DRX and the parameters of Uu DRX to match each other, that is, to allow parameters of sidelink DRX to be integer multiples of parameters of Uu DRX, that is, parameters of PC5 DRX=N*(parameters of Uu DRX), specifically, N=1, 2, . . . , Nmax, the product of Nmax and the periodicity of Uu DRX does not exceed a minimum delay among service delays of the V2X services, specifically, the periodicity of Uu-DRX refers to a default periodicity of Uu-DRX, for example, a periodicity of Uu-DRX of a system message broadcast, or a P-UE dedicated periodicity of Uu-DRX set by a base station through an RRC signaling.

In an embodiment, the energy saving method further includes: an operation 170.

The operation 170 may include, in a case where the network side rejects to modify the fifth parameter, resending the request according to timer information; and in a case where the number of times of sending requests exceeds a preset threshold, the sidelink DRX parameter is invalid.

In this embodiment, after receiving the request from the P-UE, the base station sends a response message to the P-UE to indicate whether to modify the Uu DRX parameter. If the base station rejects to modify the parameters of Uu DRX, the configuration of the parameters of sidelink DRX acquired by the P-UE is invalid, the P-UE can renegotiate the parameters of sidelink DRX with the network side to allow the parameters of sidelink DRX to match the parameters of Uu DRX; or, after a period of time (for example, a set timer expires), the P-UE again requests the base station to modify the Uu DRX parameter; and if the number of requests exceeds a preset threshold, the P-UE cannot perform sidelink discontinuous reception with the target equipment.

In an embodiment, the related configuration parameter further includes: a fifth parameter, specifically, the fifth parameter includes parameters of Uu interface DRX configured by a network side; and the energy saving method further includes: an operation 180.

The operation 180 may include, in a case where the parameters of sidelink DRX are smaller than the parameters of Uu interface DRX, entering a connected state, and requesting a network side to modify the fifth parameters, to allow the parameters of sidelink DRX to be integer multiples of the fifth parameters.

This embodiment is applicable to a P-UE in-coverage, in an RRC idle state or an RRC inactive state, and the sidelink communication type of the P-UE may be a sidelink unicast communication, a sidelink groupcast communication or a sidelink broadcast communication. The P-UE first determines the sidelink DRX parameter according to a minimum delay among service delays of the V2X services, and the periodicity of PC5 DRX corresponding to the sidelink DRX parameter does not exceed the minimum delay of the V2X services; then, the P-UE compares the above sidelink DRX parameter with a default periodicity of Uu-DRX of the system message broadcast, and if the periodicity of PC5 DRX is not smaller than the periodicity of Uu-DRX, the sidelink DRX parameter can be used; and if the periodicity of PC5 DRX is smaller than the periodicity of Uu-DRX, the P-UE re-determines a sidelink DRX parameter and the re-determined sidelink DRX parameter should be larger than or equal to the periodicity of Uu-DRX and smaller than or equal to the minimum delay of the V2X services. If the above relationship cannot be met, the P-UE enters the RRC connected state and sends a request message to the base station to request the base station to modify the periodicity of Uu-DRX.

In an embodiment, the energy saving method further includes: an operation 111 and an operation 112.

The operation 111 may include, in a case where the connection state is an RRC idle state, negotiating the fifth parameter (i.e., the Uu DRX parameter) with an AMF by using an NAS signaling.

The operation 112 may include, in a case where the connection state is an RRC inactive state, negotiating the fifth parameter (i.e., the Uu DRX parameter) with at least one of a base station or an AMF.

In an embodiment, the energy saving method further includes an operation 100.

The operation 100 may include, in a case where a cell on a frequency capable of providing sidelink communication is scanned and the cell meets a cell selection criterion, determining that the location information is in-coverage; otherwise, determining that the location information is out-of-coverage.

In this embodiment, the P-UE determines whether it is within coverage of the NR by the following method: if a cell on a frequency capable of providing an NR sidelink communication is scanned by the P-UE, and the cell meets an S criterion (cell selection criterion), then it is determined that the P-UE is located within coverage of the NR, otherwise it is determined that the P-UE is located out of coverage of the NR. The above-mentioned scanning may be performed within the range of a bandwidth part (BWP) activated by the V2X communication, or may be within the entire V2X frequency band.

In an embodiment, the energy saving method further includes: an operation 101.

The operation 101 may include, in a case where the location information is in-coverage, converting a direct frame number (DFN) of the global navigation satellite system (GNSS) into a system frame number (SFN) according to a system message.

In this embodiment, the sidelink DRX and the Uu DRX use the same SFN in a case of being in-coverage, that is, the P-UE uses the time of the base station as a reference, and if the P-UE takes the DFN of the GNSS as a reference, it is required to convert the DFN according to the system message into SFN, and in a case of being out-of-coverage, the UEs participating in the V2X communication are required to take the same time reference, for example, all the UEs take DFN of GNSS as the time reference, or one UE is taken as the time reference to ensure that the sidelink DRX settings of different UEs are aligned in time.

Figure 3:
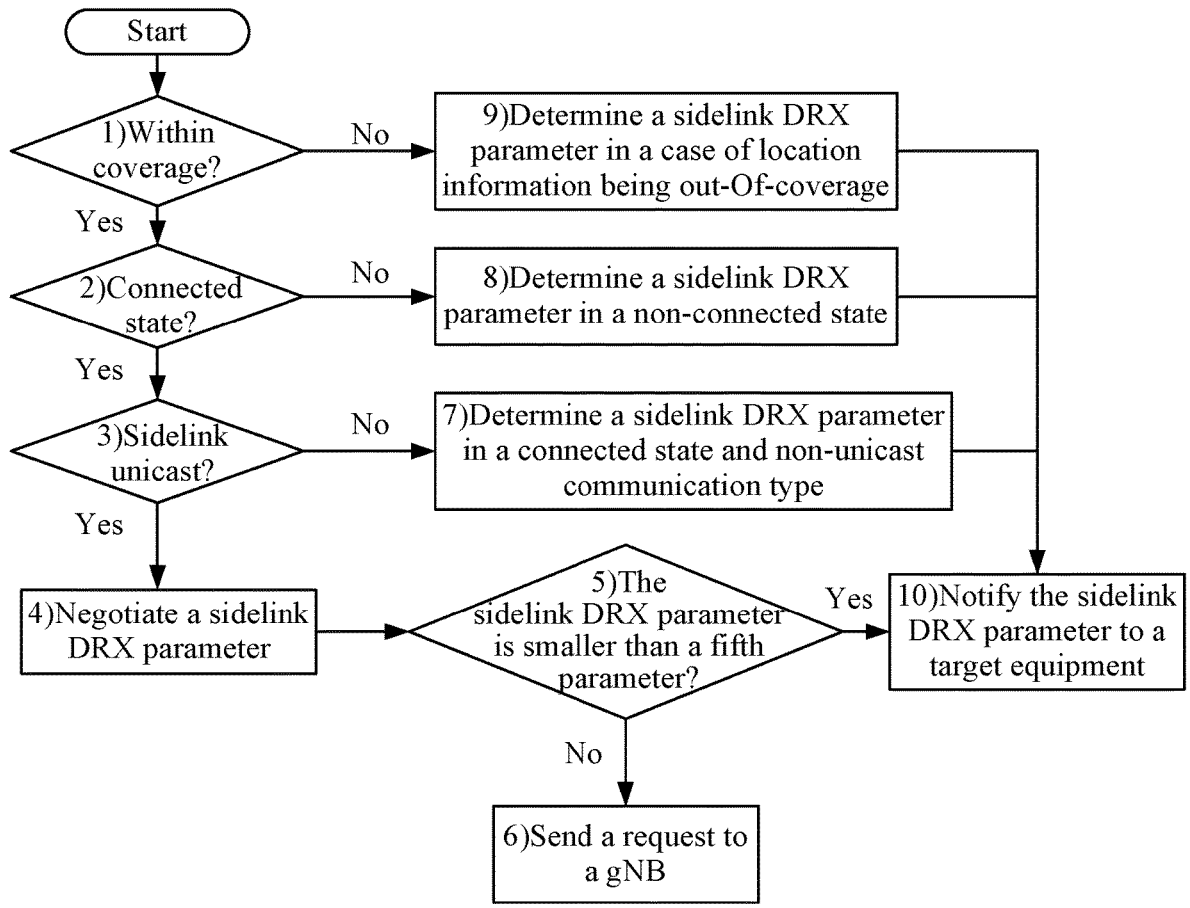
FIG. 3 is a schematic diagram of determining a sidelink DRX parameter according to an embodiment.

FIG. 3 is a schematic diagram of determining a sidelink DRX parameter according to an embodiment. As shown in FIG. 3, the process of determining the sidelink DRX parameter is as follows:

1) For a P-UE, first it is determined whether the P-UE is within coverage of NR, if the P-UE is within coverage of NR, the process goes to 2), it is determined whether the P-UE is in an RRC connected state; and if the P-UE is out of coverage of NR, the process goes to 9), it is determined a sidelink DRX parameter corresponding to the P-UE in a case of being out-of-coverage.

2) it is determined whether the P-UE is in an RRC connected state, and if it is determined that the P-UE is in an RRC connected state, the process goes to 3), it is determined whether the P-UE is in a sidelink unicast communication; and if it is determined that the P-UE is not in a sidelink unicast communication, the process goes to 8), a sidelink DRX parameter of the P-UE in an RRC idle state or an RRC inactive state is determined.

If the P-UE has established an RRC connection with the base station, that is, an uplink synchronization has been established between the P-UE and the base station and the P-UE can send information to the base station, it is determined that the P-UE is in an RRC connected state, otherwise, the P-UE is in an RRC idle state or an RRC inactive state.

3) It is determined whether the P-UE is in a sidelink unicast communication, and if it is determined that the P-UE is in the sidelink unicast communication, the process goes to 4); and if it is determined that the P-UE is not in a sidelink unicast communication, the process goes to 7), and a sidelink DRX parameter corresponding to a sidelink groupcast communication or sidelink broadcast communication is determined.

If the P-UE establishes a sidelink RRC connection with a peer UE participating in the sidelink communication, it is determined that the P-UE is in a sidelink unicast communication; otherwise, it is determined that the P-UE is in a broadcast communication or groupcast communication.

4) The P-UE negotiates with the peer UE participating in the sidelink unicast communication to determine the sidelink DRX parameter.

In this case, the sidelink communication type of the P-UE is sidelink unicast communication, the P-UE negotiates the sidelink DRX parameter with the peer UE, and multiple V2X applications can run on the P-UE, and different V2X applications have different DRX requirements, and periodicities of PC5 DRX corresponding to the sidelink DRX parameters selected by the P-UE do not exceed the minimum delay Tapp-min among delays of the V2X applications. If the periodicity of PC5 DRX corresponding to the sidelink DRX parameter given by the P-UE is T1, and the periodicity of PC5 DRX given by the peer UE is T2, a final periodicity of PC5 DRX should be T=min (T1, T2), that is, a smaller periodicity value is selected as the final periodicity of PC5 DRX. The sidelink DRX parameters besides the periodicity of PC5 DRX, such as the values of various DRX-related timers, are determined according to the same principle, that is, a smaller value of the two is selected as the final PC5 DRX parameter value to meet delay requirements of different V2X applications.

5) It is determined whether the sidelink DRX parameter is smaller than a fifth parameter configured by the network side, if the sidelink DRX parameter is smaller than the fifth parameter configured by the network side, the process goes to 6), the P-UE sends a request to the base station to request the base station to modify the fifth parameter; and if the sidelink DRX parameter is not smaller than the fifth parameter configured by the network side, the process goes to 10), the sidelink DRX parameter is notified to the target equipment.

The P-UE is in an RRC connected state, and the P-UE reads a Uu DRX parameter configured by a base station. If the P-UE's sidelink DRX parameter does not match the Uu DRX parameter, for example, the periodicity of PC5 DRX corresponding to the sidelink DRX parameter is smaller than the periodicity of Uu-DRX, in this case, the P-UE within coverage is required to use the V2X communication parameter configured by the base station. If the Uu interface is still in the sleep state of DRX when the sidelink is waken up from DRX to monitor the PSCCH, the P-UE cannot obtain the V2X communication parameter, which will cause V2X communication failure. In this case, the P-UE sends indication information to the base station, for example, to request the gNB to modify the Uu DRX parameter, to allow the sidelink DRX parameter and Uu DRX parameter to match each other.

6) The P-UE sends a request to the base station to request the base station to modify the fifth parameter.

7) The P-UE determines a PC5 DRX parameter corresponding to an RRC connected state.

The P-UE is in a sidelink groupcast communication or sidelink broadcast communication, and the P-UE is a source node of the sidelink groupcast communication or sidelink broadcast communication, then the P-UE determines the sidelink DRX parameter according to the minimum delay requirement of the V2X services, and the periodicity of PC5 DRX does not exceed the minimum delay of the V2X services. In addition, if the sidelink DRX parameter of the P-UE does not match the Uu DRX parameter, the P-UE can send indication information to the base station, for example, requesting the gNB to modify the Uu DRX parameter, to allow the sidelink DRX parameter and the Uu DRX parameter to match each other.

The P-UE or the network side can send the finally determined sidelink DRX parameter to a groupcast member in a groupcast group of the PC5 interface, or send by broadcast to other UEs nearby participating in the PC5 broadcast. If the P-UE is a V2X groupcast member or broadcast receiver, the P-UE may also notify the determined PC5 DRX parameter to other UEs.

8) The P-UE determines a sidelink DRX parameter corresponding to an RRC idle state or an RRC inactive state, and the sidelink DRX parameter includes a periodicity of PC5 DRX.

The P-UE first determines the sidelink DRX parameter according to a minimum delay of the V2X services, and the periodicity of PC5 DRX should meet the condition of not exceeding the minimum delay of the V2X services; then, the P-UE compares the above periodicity of PC5 DRX with a default periodicity of Uu-DRX of the system message broadcast, and if the periodicity of PC5 DRX is not smaller than the default periodicity of Uu-DRX, the sidelink DRX parameter is used; and if the periodicity of PC5 DRX is smaller than the default periodicity of Uu-DRX, the P-UE resets the sidelink DRX parameter, and it should meet that the periodicity of PC5 DRX is longer than or equal to the periodicity of Uu-DRX, and the periodicity of PC5 DRX should be shorter than or equal to the minimum delay of the V2X services. If the above relationship cannot be met, the P-UE enters an RRC connected state and sends a request message to the base station to request the base station to modify the periodicity of Uu-DRX.

The periodicity of PC5 DRX corresponding to the sidelink DRX parameter of the P-UE in an RRC idle state or an RRC inactive state on the PC5 interface is set to be an integer multiple of the periodicity of Uu-DRX of the P-UE on the Uu interface: periodicity of PC5-DRX=N*(periodicity of Uu-DRX), N=1, 2, . . . , Nmax, specifically, Nmax is a positive integer, and the product of Nmax and the periodicity of Uu-DRX is smaller than a minimum delay of the V2X messages.

9) The P-UE determines a sidelink DRX parameter when the P-UE has location information of out-of-coverage.

If the P-UE is located out of coverage of NR, the P-UE can use a pre-configured periodicity of PC5 DRX stored by itself, or use a periodicity of PC5 DRX of inter-frequency V2X communication broadcasted in the current cell. If the cell, where the P-UE is currently resided, broadcasted a periodicity of PC5 DRX of inter-frequency V2X communication, the P-UE cannot use the pre-configured periodicity of PC5 DRX, but can only use the periodicity of PC5 DRX of the inter-frequency V2X communication broadcasted by the cell; and if neither the pre-configured periodicity of PC5 DRX nor the periodicity of PC5 DRX of the inter-frequency V2X communication broadcasted by the cell is presented, the P-UE can independently configure a sidelink DRX parameter to ensure that the periodicity of PC5 DRX does not exceed a minimum delay of the V2X services.

10) The P-UE or the network side notifies the determined sidelink DRX parameter to a target equipment, for example, a peer UE in the sidelink unicast communication, or a group member in the sidelink groupcast communication, or other UEs participating in the broadcast communication in the sidelink broadcast communication, to allow the target equipment to send V2X information to the P-UE at a proper moment (for example, on duration corresponding to the sidelink DRX parameter). The transmission of PSFCH information and SPS PSSCH is not affected.

A parameter configuration method is further provided according to an embodiment of the present disclosure, which is applied to a base station, specifically, the base station is, for example, a gNB. The operations performed by the base station in this embodiment correspond to the operations performed by the above UE, and for technical details not described in detail in this embodiment, reference may be made to any of the above embodiments.

Figure 4:
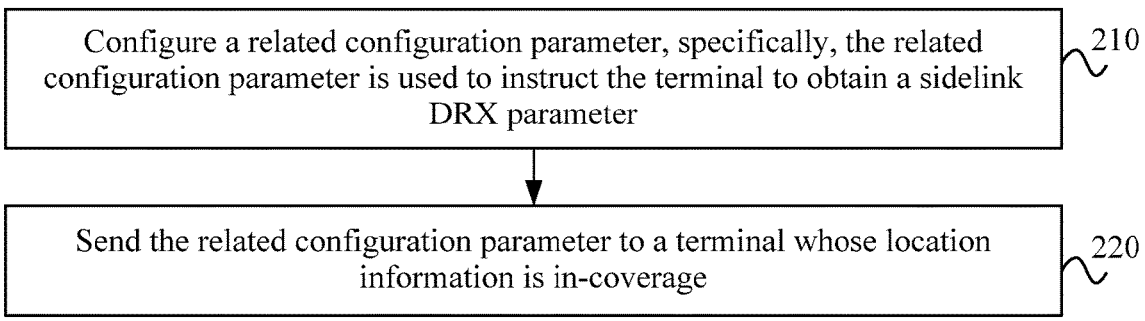
FIG. 4 is a flowchart of a parameter configuration method according to an embodiment.

FIG. 4 is a flowchart of a parameter configuration method according to an embodiment. As shown in FIG. 4, the method according to this embodiment includes an operation 210 and an operation 220.

The operation 210 may include configuring a related configuration parameter, specifically, the related configuration parameter is used to instruct a UE to acquire a sidelink DRX parameter.

In this embodiment, the sidelink DRX parameter, namely the PC5 DRX parameter, mainly includes a periodicity of PC5 DRX, which is used to reflect when a P-UE can stop monitoring a physical sidelink control channel.

The operation 220 may include sending the related configuration parameter to a UE whose location information is in-coverage.

In this embodiment, a UE within coverage can determine the sidelink DRX parameter according to one or more of location information, a sidelink communication type, a preconfigured related configuration parameter, and a related configuration parameter configured by a base station, or a base station can determine a sidelink DRX parameter according to location information, a sidelink communication type, and a related configuration parameter and indicate the sidelink DRX parameter to the P-UE; and a UE out-of-coverage can determine a sidelink DRX parameter based on one or more of location information, a sidelink communication type, and a preconfigured related configuration parameter.

In the parameter configuration method according to this embodiment, a related configuration parameter is configured, for a UE within coverage to determine a sidelink DRX parameter, and based on which, the UE can stop monitoring the physical sidelink control channel within a period of time, thereby reducing energy consumption of the UE.

In an embodiment, the related configuration parameter includes at least one of the following: a second parameter (i.e., para2); or a parameter of Uu interface DRX (i.e., para5); specifically, the second parameter includes a parameter for sidelink inter-frequency scheduling (i.e., para2.3).

In an embodiment, the related configuration parameter includes a fifth parameter para5; and the method further includes: an operation 230.

The operation 230 may include, in a case where the sidelink DRX parameter is smaller than the fifth parameter para5, receiving a request from the UE; modifying the fifth parameter para5 according to the request, to allow the sidelink DRX parameter to be an integer multiple of the fifth parameter (para5).

In this embodiment, after receiving the request from the P-UE, the base station may further send a response message to the P-UE to indicate whether to modify the Uu DRX parameter. If the base station rejects to modify the Uu DRX parameter, the sidelink DRX parameter configuration determined by the P-UE is invalid, and the P-UE can renegotiate the sidelink DRX parameter with the network side to make the sidelink DRX parameter match the Uu DRX parameter; or, after a period of time (for example, the set timer expires), the P-UE requests the base station to modify the Uu DRX parameter again; and if the base station rejects the request for more than a certain number of times, the sidelink DRX parameter is invalid, and the P-UE cannot perform sidelink discontinuous reception with the target equipment.

Figure 5:
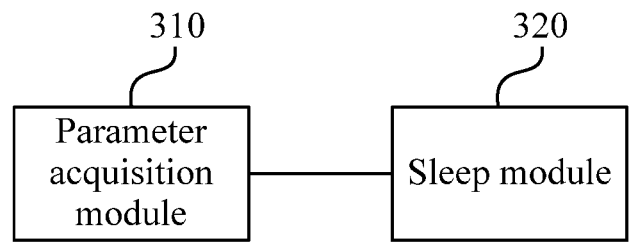
FIG. 5 is a schematic structural diagram of an energy-saving apparatus according to an embodiment.

An energy-saving apparatus is further provided according to an embodiment of the present disclosure. FIG. 5 is a schematic structural diagram of an energy-saving apparatus according to an embodiment. As shown in FIG. 5, the energy-saving apparatus includes: a parameter acquisition module 310 and a sleep module 320.

The parameter acquisition module 310 is configured to acquire a sidelink DRX parameter, specifically, the sidelink DRX parameter is determined according to location information, a sidelink communication type and a related configuration parameter of the UE. The sleep module 320 is configured to not receive SCI from a target equipment during a sidelink sleep time corresponding to the sidelink DRX parameter.

With the energy-saving apparatus of this embodiment, by determining a sidelink discontinuous reception (DRX) parameter, the UE can stop monitoring a physical sidelink control channel within a period of time, thereby reducing energy consumption of the UE.

In an embodiment, the location information includes one of the following: in-coverage, or out-of-coverage; the sidelink communication type includes one of the following: sidelink unicast communication, sidelink groupcast communication, or sidelink broadcast communication.

In an embodiment, the sidelink DRX parameter is determined also according to a connection state of the UE; the connection state includes one of the following: an RRC connected state, an RRC idle state, or an RRC inactive state.

In an embodiment, the sidelink DRX parameter is notified to the target equipment by the UE or by a network side.

In an embodiment, the sidelink DRX parameter is determined by a network side or independently selected by a UE; in a case where location information of the UE is in-coverage, the sidelink DRX parameter is determined by a network side or independently selected by the UE; and in a case where location information of the UE is out-of-coverage, the sidelink DRX parameter is independently selected by the UE.

In an embodiment, the network side includes at least one of the following: a base station or an access and mobility management function (AMF). Specifically, the base station indicates the sidelink DRX parameter to the UE through an RRC signaling; and the AMF indicates the sidelink DRX parameter to the UE through an NAS signaling.

In an embodiment, the apparatus further includes: an on duration determination module, configured to determine a sidelink on duration in a periodicity of DRX of the UE according to the sidelink DRX parameter; and a detection module, configured to start a timer T and detect SCI from the target equipment at the beginning of the sidelink on duration; if it is detected that the SCI from the target equipment is received before the timer T expires, restart the timer T and continue to detect the SCI; if it is detected that the SCI from the target equipment is not received before the timer T expires, enter sidelink sleep.

In an embodiment, the apparatus further includes: a sleep duration determination module configured to determine a sidelink sleep time of the UE according to the sidelink DRX parameter; within the sidelink sleep time, the UE is allowed to receive the SPS PSSCH and PSFCH sent by the target equipment; and the UE enters the sidelink sleep through one of the following ways: a preset timer T expiring or a MAC CE command.

In an embodiment, the related configuration parameter includes at least one of the following: a first parameter determined according to a minimum service delay among service delays of sidelink services running on the UE; a second parameter configured by a network side; a preconfigured third parameter; a fourth parameter indicated by a target equipment of the sidelink unicast communication; or a fifth parameter indicated by a Uu interface DRX parameter configured by a network side.

In an embodiment, in a case where the location information is in-coverage, the sidelink communication type is a sidelink unicast communication and the connection state is an RRC connected state, the related configuration parameter includes a first parameter, a second parameter and a fourth parameter; specifically, the second parameter includes a parameter configured by a base station; the sidelink DRX parameter is a minimum value among the first parameter, the second parameter and the fourth parameter; and the target equipment includes a UE participating in a sidelink unicast communication.

In an embodiment, in a case where the location information is in-coverage, the sidelink communication type is a sidelink groupcast communication or sidelink broadcast communication and the connection state is an RRC connected state, the related configuration parameter includes a first parameter and a second parameter; specifically, the second parameter includes a parameter configured by the base station; the sidelink DRX parameter is a minimum value among the first parameter and the second parameter; and the target equipment includes a member UE in a groupcast group or a UE within the range of broadcast.

In an embodiment, in a case where the location information is in-coverage, the sidelink communication type is a sidelink unicast communication, and the connection state is an RRC idle state or RRC inactive state, the related configuration parameter includes a first parameter, a second parameter and a fourth parameter; the sidelink DRX parameter is a minimum value among the first parameter, the second parameter and the fourth parameter; and the target equipment includes a UE participating in a sidelink unicast communication.

In an embodiment, in a case where the location information is in-coverage, the sidelink communication type is a sidelink groupcast communication or sidelink broadcast communication and the connection state is an RRC idle state or RRC inactive state, the related configuration parameter includes a first parameter and a second parameter; the sidelink DRX parameter is a minimum value among the first parameter and the second parameter; and the target equipment includes a member UE in a groupcast group or a UE within the range of broadcast.

In an embodiment, the second parameter includes: a parameter configured by a base station and a parameter configured by an AMF; or, the second parameter includes: a parameter configured by a base station, a parameter configured by an AMF, and a parameter for sidelink inter-frequency scheduling configured by the base station.

In an embodiment, in a case where the location information is out-of-coverage and the sidelink communication type is a sidelink unicast communication, the related configuration parameter includes a first parameter, a third parameter and a fourth parameter; the sidelink DRX parameter is a minimum value among the related configuration parameters; and the target equipment includes a UE participating in a sidelink unicast communication.

In an embodiment, in a case where the location information is out-of-coverage and the sidelink communication type is a sidelink groupcast communication or sidelink broadcast communication, the related configuration parameter includes a first parameter and a third parameter; the sidelink DRX parameter is a minimum value among the related configuration parameters; and the target equipment includes a member UE in a groupcast group or a UE within the range of broadcast.

In an embodiment, the related configuration parameter further includes: a second parameter, and the second parameter includes a parameter for sidelink inter-frequency scheduling configured by a base station.

In an embodiment, the related configuration parameter further includes: a fifth parameter, and the fifth parameter includes an Uu interface DRX parameter configured by a network side; the apparatus further includes: a first request module configured to, in a case where the sidelink DRX parameter is smaller than the fifth parameter, request the network side to modify the fifth parameter to allow the sidelink DRX parameter to be an integer multiple of the fifth parameter.

In an embodiment, the apparatus further includes: a repeat request module, configured to resend the request according to timer information in a case where the network side rejects to modify the fifth parameter; and in a case where the number of times of sending requests exceeds a preset threshold, the sidelink DRX parameter is invalid.

In an embodiment, the related configuration parameter further includes: a fifth parameter, specifically, the fifth parameter includes a Uu interface DRX parameter (para5) configured by a network side. The apparatus further includes: a second request module configured to, in a case where the sidelink DRX parameter is smaller than the Uu interface DRX parameter, enter a connected state, and request a network side to modify the fifth parameter, to allow the sidelink DRX parameter to be an integer multiple of the fifth parameter.

In an embodiment, the apparatus further includes: a negotiation module configured to, in a case where the connection state is an RRC idle state, use a NAS signaling to negotiate the fifth parameter with an AMF; and in a case where the connection state is an RRC inactive state, negotiate the fifth parameter with at least one of a base station or an AMF.

In an embodiment, the apparatus further includes: a location information determining module, configured to, in a case where a cell on a frequency capable of providing a sidelink communication is scanned and the cell meets a cell selection criterion, determine that the location information is in-coverage; otherwise, determine that the location information is out-of-coverage.

In an embodiment, the apparatus further includes: a conversion module configured to convert a DFN of the GNSS to an SFN according to a system message in a case where the location information is in-coverage.

The energy-saving apparatus set forth in this embodiment pertains to the same concept as the energy-saving method proposed in the above embodiments. For technical details not described in detail in this embodiment, reference may be made to any of the above embodiments, and this embodiment has the same technical effects as those obtained through executing the energy-saving method.

Figure 6:
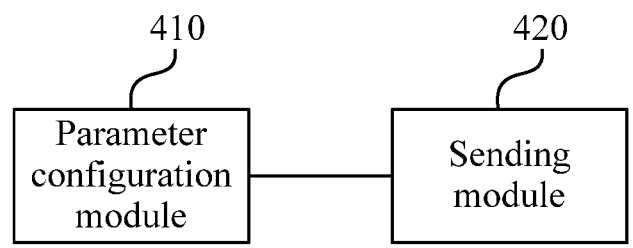
FIG. 6 is a schematic structural diagram of a parameter configuration apparatus according to an embodiment.

A parameter configuration apparatus is further provided according to an embodiment of the present disclosure. FIG. 6 is a schematic structural diagram of a parameter configuration apparatus according to an embodiment. As shown in FIG. 6, the parameter configuration apparatus includes: a parameter configuration module 410 and a sending module 420.

The parameter configuration module 410 is configured to configure a related configuration parameter, the related configuration parameter is used to instruct a UE to obtain a sidelink DRX parameter; and the sending module 420 is configured to send the related configuration parameter to a UE whose location information is in-coverage.

The energy-saving apparatus according to this embodiment configures related configuration parameters, for the UE to determine a sidelink DRX parameter, and based on which, the UE can stop monitoring a physical sidelink control channel within a period of time, thereby reducing energy consumption of the UE.

In an embodiment, the related configuration parameter includes at least one of the following: a second parameter; or a Uu interface DRX parameter. Specifically, the second parameter includes a parameter for sidelink inter-frequency scheduling.

In an embodiment, the related configuration parameter includes a fifth parameter; the apparatus further includes: a request receiving module configured to receive a request from a UE in a case where the sidelink DRX parameter is smaller than the fifth parameter; and a modification module, configured to modify the fifth parameter according to the request, to allow the sidelink DRX parameter to be an integer multiple of the fifth parameter.

The parameter configuration apparatus proposed in this embodiment pertains to the same concept as the parameter configuration method proposed in the above embodiments. For technical details not described in detail in this embodiment, reference may be made to any of the above embodiments, and this embodiment has the same technical effects as those obtained through executing the parameter configuration method.

A terminal is further provided according to an embodiment of the present disclosure. The energy saving method may be executed by an energy-saving apparatus, and the energy-saving apparatus may be implemented by means of software and/or hardware and integrated in the terminal. The terminal refers to a pedestrian terminal P-UE in V2P communication, and the P-UE is generally a handheld mobile device.

Figure 7:
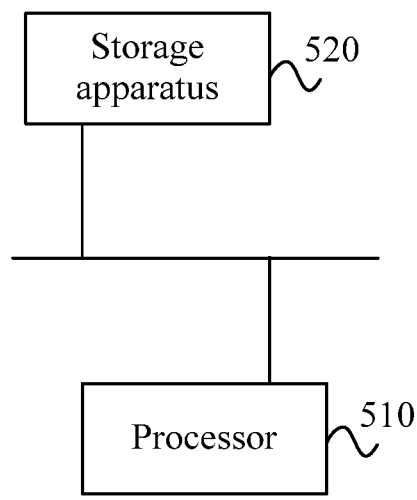
FIG. 7 is a schematic diagram of a hardware structure of a terminal according to an embodiment.

FIG. 7 is a schematic diagram of a hardware structure of a terminal according to an embodiment. As shown in FIG. 7, a terminal according to this embodiment includes: a processor 510 and a storage apparatus 520. The number of processors in the terminal may be one or more. In FIG. 7, one processor 510 is taken as an example. The processor 510 and the storage apparatus 520 in the device may be connected by a bus or in other ways, and connecting by a bus is taken as an example in FIG. 7.

The one or more programs are executed by the one or more processors 510, to cause the one or more processors to implement the energy saving method described in any of the above embodiments.

The storage apparatus 520 in the terminal, as a computer-readable storage medium, may be used to store one or more programs, and the programs may be software programs, computer-executable programs, and modules, such as those program instructions/modules corresponding to the energy-saving methods in the embodiments of the present disclosure (for example, the modules in the energy-saving apparatus shown in FIG. 5 include: the parameter acquisition module 310 and the sleep module 320). The processor 510 executes data processing and various functional applications of the terminal by running the software programs, instructions and modules stored in the storage apparatus 520, that is, to implement the energy saving method in the above method embodiments.

The storage apparatus 520 mainly includes a program storage area and a data storage area. Specifically, the program storage area may store an operating system and an application program required by at least one function; and the data storage area can store data created according to the use of the device, etc. (for example, the sidelink DRX parameters, location information, etc. in the above embodiments). Furthermore, the storage apparatus 520 may include a high-speed random access memory, and may further include a non-volatile memory, such as at least one magnetic disk storage apparatus, a flash memory device, or other non-volatile solid-state storage apparatus. In some examples, the storage apparatus 520 may include a memory located remotely with respect to the processor 510, these remote processors may be connected to the terminal through a network. Examples of such network include, but are not limited to, the internet, an intranet, a local area network, a mobile communication network, and combinations thereof.

In addition, one or more programs included in the above-mentioned terminal, when being executed by the one or more processors 510, implements the following operations: acquiring a sidelink DRX parameter, specifically, the sidelink DRX parameter is determined according to location information, a sidelink communication type and a related configuration parameter of a terminal; and not receiving SCI from a target equipment within a sidelink sleep time corresponding to the sidelink DRX parameter.

The terminal proposed in this embodiment pertains to the same concept as the energy-saving method proposed in the above-mentioned embodiment. For technical details not described in detail in this embodiment, reference may be made to any of the above embodiments, and this embodiment has the same technical effects as those obtained through executing the energy-saving method.

A base station is further provided according to an embodiment of the present disclosure. The parameter configuration method may be performed by a parameter configuration apparatus, which may be implemented in software and/or hardware and integrated in the base station. The base station is, for example, NG-RAN, gNB.

Figure 8:
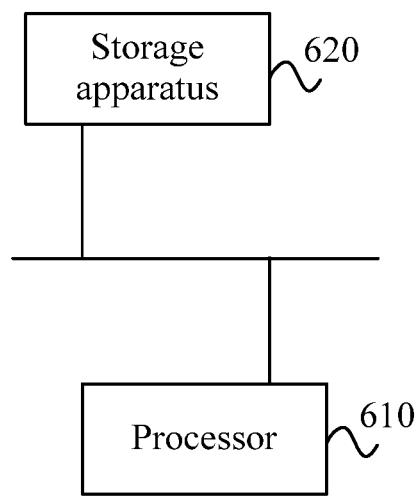
FIG. 8 is a schematic diagram of a hardware structure of a base station according to an embodiment.

FIG. 8 is a schematic diagram of a hardware structure of a base station according to an embodiment. As shown in FIG. 8, the base station according to this embodiment includes: a processor 610 and a storage apparatus 620. The number of processors in the base station may be one or multiple. In FIG. 8, one processor 610 used is taken as an example. The processor 610 and the storage apparatus 620 in the device may be connected by a bus or in other ways. Connection by a bus is taken as an example.

The one or more programs are executed by the one or more processors 610, to cause the one or more processors to implement the parameter configuration method described in any of the above embodiments.

As a computer-readable storage medium, the storage apparatus 620 in the base station can be used to store one or more programs, and the programs can be software programs, computer-executable programs and modules, for example, the programs instructions and modules corresponding to the parameter configuration method in this embodiment (for example, the modules in the parameter configuration apparatus shown in FIG. 6 include: the parameter configuration module 410 and the sending module 420). The processor 610 executes various functional applications and data processing of the base station by running the software programs, instructions and modules stored in the storage apparatus 620, that is, implements the parameter configuration method in the above method embodiments.

The storage apparatus 620 mainly includes a program storage area and a data storage area, where the program storage area may store an operating system and at least one application program required by functions, the data storage area may store data created during a utilization of the device, and etc. (such as the related configuration parameters in the above embodiments), furthermore, the storage apparatus 620 may include a high-speed random access memory, and may further include a non-volatile memory, such as at least one magnetic disk storage apparatus, a flash memory device, or other non-volatile solid-state storage apparatus. In some examples, the storage apparatus 620 may include memories which are remotely provided with respect to the processor(s) 610, and these remote memories may be connected to the base station through a network. Examples of the aforementioned network include, but are not limited to, the Internet, an intranet, a local area network, a mobile communication network, or any combination thereof.

Moreover, when the one or more programs included in the above base station are executed by the one or more processors 610, the following operations are implemented: configuring a related configuration parameter, specifically, the related configuration parameter is used to instruct the terminal to acquire a sidelink DRX parameter; and sending the related configuration parameter to a terminal whose location information is in-coverage.

The base station proposed in this embodiment pertains to the same concept as the energy saving method proposed in the above embodiments. For technical details not described in detail in this embodiment, reference may be made to any of the above-mentioned embodiments, and this embodiment has the same technical effects as those obtained through executing the energy-saving method.

A storage medium containing computer-executable indications is further provided according to embodiments of the present disclosure, specifically, the computer-executable indications, when executed by a computer processor, are used to execute an energy saving method.

Through the above description of the embodiments, the present disclosure can be implemented by software and general hardware, and can also be implemented by hardware. The technical solution of the present disclosure can be embodied in the form of a software product, and the computer software product can be stored in a computer-readable storage medium, such as a floppy disk of a computer, a read-only memory (ROM), a random access memory (RAM), a flash memory (FLASH), a hard disk or optical disk, etc., and the computer software product include multiple indications to enable one computer device (which may be a personal computer, server, or network device, etc.) to execute the energy saving method or the parameter configuration method according to any of the embodiments of this application.

The energy-saving method includes: acquiring a sidelink discontinuous reception DRX parameter, specifically, the sidelink DRX parameter is determined according to location information, a sidelink communication type and a related configuration parameter of a terminal; and within a sidelink sleep time corresponding to the sidelink DRX parameter, not receiving SCI from the target equipment.

The parameter configuration method includes: configuring a related configuration parameter, specifically, the related configuration parameter is used to instruct a terminal to acquire a sidelink DRX parameter; and sending the related configuration parameter to a terminal whose location information is in-coverage.

The block diagrams of any logic flows in drawings of the present application may represent program steps, or may represent interconnected logic circuits, modules, and functions, or may represent a combination of program steps, logic circuits, modules, and functions. The computer programs may be stored in a memory. The memory may be of any type suitable for a local technical environment and may be implemented using any suitable data storage technology, such as, but not limited to, a read-only memory (ROM), a random-access memory (RAM) and an optical memory apparatus and system (digital video disk (DVD) or compact disc (CD)). The computer-readable storage medium may include a non-transitory storage medium. The data processor may be of any type appropriate for the local technical environment such as, but not limited to, a general-purpose computer, a special purpose computer, a microprocessor, a digital signal processor (DSP), an application specific integrated circuit (ASIC), a field-programmable gate array (FPGA), and a processor based on a multi-core processor architecture.

What is claimed is:

1. An energy saving method, applied to a terminal, comprising:
   acquiring a sidelink discontinuous reception (DRX) parameter, wherein the sidelink DRX parameter is determined according to location information, a sidelink communication type and one or more related configuration parameters of the terminal; and
   not receiving sidelink control information (SCI) from a target equipment during a sidelink sleep time corresponding to the sidelink DRX parameter,
   wherein the method further comprises:
   determining a sidelink sleep time of the terminal according to the sidelink DRX parameter; wherein during the sidelink sleep time, the terminal is allowed to receive a semi-persistent scheduling (SPS) physical sidelink shared channel (PSSCH) and physical sidelink feedback channel (PSFCH) sent by the target equipment; and
   the terminal enters sidelink sleep through one of: a preset timer T expiring, or a medium access control (MAC) control element (CE) command.

2. The method according to claim 1, wherein the location information comprises one of: in-coverage, or out-of-coverage; and
   the sidelink communication type comprises one of: sidelink unicast communication, sidelink groupcast communication, or sidelink broadcast communication.

3. The method according to claim 2, wherein the sidelink DRX parameter is also determined according to a connection state of the terminal; and
   the connection state comprises one of: a radio resource control (RRC) connected state, an RRC idle state or an RRC inactive state.

4. The method according to claim 1, wherein the sidelink DRX parameter is notified to the target equipment by the terminal or by a network side.

5. The method according to claim 2, wherein the sidelink DRX parameter is determined by a network side or independently selected by the terminal;
   in a case where the location information of the terminal is in-coverage, the sidelink DRX parameter is determined by a network side or independently selected by the terminal; and
   in a case where the location information of the terminal is out-of-coverage, the sidelink DRX parameter is independently selected by the terminal.

6. The method according to claim 4, wherein the network side comprises at least one of: a base station or an access and mobility management function (AMF);
   wherein, in a case where the network side comprises the base station, the sidelink DRX parameter is indicated by the base station to the terminal through an RRC signaling; and
   in a case where the network side comprises the AMF, the sidelink DRX parameter is indicated by the AMF to the terminal through a non-access stratum (NAS) signaling.

7. The method according to claim 1, further comprising:
   determining a sidelink operation time in a DRX cycle of the terminal according to the sidelink DRX parameter;
   starting a timer T and detecting the SCI from the target equipment at the beginning of the sidelink operation time;
   in a case where the SCI from the target equipment is received before the timer T expires, restarting the timer T and continuing to detect the SCI from the target equipment; and
   in a case where the SCI from the target equipment is not received before the timer T expires, entering sidelink sleep.

8. The method according to claim 1, wherein the one or more related configuration parameters comprise at least one of:
- a first parameter, wherein the first parameter is determined according to a minimum service delay among service delays of sidelink services running on the terminal;
- a second parameter, configured by a network side;
- a preconfigured third parameter;
- a fourth parameter, indicated by a target equipment of a sidelink unicast communication; or
- a fifth parameter, indicated by a Uu interface DRX parameter configured by the network side.

9. The method according to claim 3, wherein, in a case where the location information is in-coverage, the sidelink communication type is a sidelink unicast communication, and the connection state is an RRC connected state, the one or more related configuration parameters comprise a first parameter, a second parameter and a fourth parameter;
- the second parameter comprises a parameter configured by a base station;
- the sidelink DRX parameter is a minimum value among the first parameter, the second parameter and the fourth parameter; and
- the target equipment comprises a terminal in a sidelink unicast communication,
- or, wherein, in a case where the location information is in-coverage, the sidelink communication type is a sidelink groupcast communication or a sidelink broadcast communication and the connection state is an RRC connected state, the one or more related configuration parameters comprise a first parameter and a second parameter;
- the second parameter comprises a parameter configured by a base station;
- the sidelink DRX parameter is a minimum value among the first parameter and the second parameter; and
- the target equipment comprises a member terminal in a groupcast group or a terminal within a range of broadcast,
- wherein the one or more related configuration parameters further comprise: a fifth parameter, and the fifth parameter comprises a Uu interface DRX parameter configured by a network side; and
- wherein the method further comprises:
- in a case where the sidelink DRX parameter is smaller than the fifth parameter, requesting the network side to modify the fifth parameter, to allow the sidelink DRX parameter to be an integer multiple of the fifth parameter.

10. The method according to claim 3, wherein in a case where the location information is in-coverage, the sidelink communication type is a sidelink unicast communication and the connection state is an RRC idle state or an RRC inactive state, the one or more related configuration parameters comprise a first parameter, a second parameter and a fourth parameter;
- the sidelink DRX parameter is a minimum value among the first parameter, the second parameter and the fourth parameter; and
- the target equipment comprises a terminal in a sidelink unicast communication,
- or, wherein, in a case where the location information is in-coverage, the sidelink communication type is a sidelink groupcast communication or a sidelink broadcast communication, and the connection state is an RRC idle state or an RRC inactive state, the one or more related configuration parameters comprise a first parameter and a second parameter;
- the sidelink DRX parameter is a minimum value among the first parameter and the second parameter; and
- the target equipment comprises a member terminal in a groupcast group or a terminal within a range of broadcast,
- wherein, the second parameter comprises: a parameter configured by a base station and a parameter configured by an AMF; or,
- the second parameter comprises: a parameter configured by a base station, a parameter configured by an AMF, and a parameter for sidelink inter-frequency scheduling configured by a base station,
- wherein the one or more related configuration parameters further comprise: a fifth parameter, and the fifth parameter comprises a Uu interface DRX parameter configured by a network side; and
- wherein the method further comprises:
- in a case where the sidelink DRX parameter is smaller than the Uu interface DRX parameter, entering a connected state, and requesting the network side to modify the fifth parameter, to allow the sidelink DRX parameter to be an integer multiple of the fifth parameter.

11. The method according to claim 2, wherein, in a case where the location information is out-of-coverage and the sidelink communication type is a sidelink unicast communication, the one or more related configuration parameters comprise a first parameter, a third parameter and a fourth parameter;
- the sidelink DRX parameter is a minimum value among the first parameter, the third parameter and the fourth parameter; and
- the target equipment comprises a terminal in a sidelink unicast communication,
- or, wherein, in a case where the location information is out-of-coverage and the sidelink communication type is a sidelink groupcast communication or a sidelink broadcast communication, the one or more related configuration parameters comprise a first parameter and a third parameter;
- the sidelink DRX parameter is a minimum value among the first parameter and the third parameter;
- the target equipment comprises a member terminal in a groupcast group or a terminal within a range of broadcast,
- wherein the one or more related configuration parameters further comprise a second parameter;
- the second parameter comprises a parameter for sidelink inter-frequency scheduling configured by a base station.

12. The method according to claim 9, further comprising:
- in a case where the request to modify the fifth parameter is rejected by the network side, resending the request according to timer information; and
- in a case where the number of times of sending requests exceeds a preset threshold, the sidelink DRX parameter is determined as being invalid.

13. The method according to claim 10, further comprising:
- in a case where the connection state is an RRC idle state, negotiating the fifth parameter with an AMF by using an NAS signaling; and
- in a case where the connection state is an RRC inactive state, negotiating the fifth parameter with at least one of a base station or an AMF.

14. The method according to claim 1, further comprising:
in a case where a cell on a frequency capable of providing sidelink communication is scanned and the cell satisfies a cell selection criterion, determining that the location information is in-coverage; and
in a case where a cell on a frequency capable of providing sidelink communication is not scanned or a cell on a frequency capable of providing sidelink communication is scanned but the cell fails to meet a cell selection criterion, determining that the location information is out-of-coverage.

15. The method according to claim 1, further comprising:
in a case where the location information is in-coverage, converting a direct frame number (DFN) of a global navigation satellite system (GNSS) into a system frame number (SFN) according to a system message.

16. A terminal, comprising:
at least one processor; and
a storage apparatus, configured to store at least one program; wherein
the at least one program, when executed by the at least one processor, causes the at least one processor to implement the energy saving method according to claim 1.

17. A non-transitory computer-readable storage medium on which a computer program is stored, wherein, the program, when executed by a processor, causes the energy saving method according to claim 1 to be implemented.

* * * * *